3,349,149
// PROCESS FOR PREPARING OLEFINS
// John G. McNulty and William L. Walsh, Glenshaw, Pa.,
// assignors to Gulf Research & Development Company,
// Pittsburgh, Pa., a corporation of Delaware
// No Drawing. Filed Oct. 21, 1964, Ser. No. 405,581
// 5 Claims. (Cl. 260—683.15)

ABSTRACT OF THE DISCLOSURE

An improvement in a process wherein an alkylaluminum chloride is reacted with an olefin in the presence of a titanium chloride to obtain a telomer of the alkylaluminum chloride and the telomer is thereafter transalkylated with an olefin which involves heating the telomer prior to transalkylation with an aluminum powder which has been obtained as a result of heating an aluminum halide with an alkali metal.

---

This invention relates to a process for preparing olefins, particularly alpha olefins.

An alkylaluminum chloride can be reacted with an olefin in the presence of a titanium chloride to form a telomer and the telomer so obtained can then be transalkylated with an olefin, the same or different than the olefin employed in the telomerization stage, to obtain an alkylaluminum chloride and a product olefin having a larger number of carbon atoms than the olefin or olefins employed in either the telomerization stage or in the transalkylation stage. Thus, an alkylaluminum chloride can be reacted with ethylene in the presence of titanium tetrachloride to form a telomer in which one or more ethylene units add to said alkylaluminum chloride between one or more of said alkyl substituents and the aluminum to which the same was previously attached. The telomer is then reacted with ethylene and transalkylation occurs, that is, the ethylene so added displaces the organic substituent on the telomer and an alpha olefin and ethylaluminum chloride are obtained.

Although the telomerization reaction and the subsequent transalkylation reaction defined above can effectively be carried out under a variety of reaction conditions, in the event the transalkylation reaction is carried out with the titanium chloride still present no appreciable amount of transalkylation will occur but undesirable telomerization will take place. Accordingly, after telomerization has been completed but before transalkylation begins it is important and critical to remove from the telomerization product the titanium chloride present therein or render the same innocuous in order to inhibit telomerization in the transalkylation reaction.

We have found that this can effectively be done by treating the telomerization product obtained above with a selected aluminum and thereafter subjecting the treated telomerization product to transalkylation conditions.

The alkylaluminum chlorides that can be employed in the first stage of the process can be defined by the following structural formula:

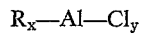

$$R_x—Al—Cl_y$$

wherein $x$ and $y$ are numbers whose sum totals 3 but $x$ can range from about 1.0 to about 1.8 and $y$ can range from about 1.2 to about 2.0, and R is an alkyl radical having from two to 20 carbon atoms, preferably from two to 12 carbon atoms, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, etc., cyclopentyl, cyclohexyl, vinylcyclohexyl, etc. Examples of alkylaluminum chlorides that can be employed are methylaluminum chlorides, ethylaluminum chlorides, propylaluminum chlorides, butylaluminum chlorides, pentylaluminum chlorides, hexylaluminum chlorides, heptylaluminum chlorides, octylaluminum chlorides, nonylaluminum chlorides, decylaluminum chlorides, undecylaluminum chlorides, dodecylaluminum chlorides, tridecylaluminum chlorides, tetradecylaluminum chlorides, pentadecylaluminum chlorides, hexadecylaluminum chlorides, heptadecylaluminum chlorides, octadecyl aluminum chlorides, etc., cyclopentyl aluminum chlorides, cyclohexyl aluminum chlorides, vinylcyclohexyl aluminum chlorides, etc. We prefer to employ ethylaluminum chlorides, propylaluminum chlorides, butylaluminum chlorides, pentylaluminum chlorides and hexylaluminum chlorides. Desirably the alkylaluminum chlorides employed are activated by passing an olefin, such as the olefin that will be employed in the telomerization and/or transalkylation stage, for example, ethylene, therethrough until the alkylaluminum chloride is saturated with said olefin. Thus, the alkylaluminum chloride can be dispersed in an inert hydrocarbon solvent, such as heptane, under a blanket of inert gas, such as nitrogen, and thereafter at a temperature and pressure which can be, for example, about 20° to about 125° C. and about 0 to about 100 pounds per square inch gauge, the olefin is bubbled through the resulting liquid until the amount of olefin leaving said liquid corresponds to the amount introduced therein. During this period there is no growth of the alkyl group on said alkylaluminum chloride.

The other component in the catalyst system employed in the telomerization stage defined above is a titanium chloride, such as titanium tetrachloride, titanium trichloride or titanium dichloride or mixtures thereof. We prefer to add titanium tetrachloride to the reaction system along with the alkylaluminum chloride.

The molar ratios of the alkylaluminum chlorides to the titanium chloride catalyst is not critical and can be varied over a wide range, for example, from about 50:1 to about 400:1, preferably from about 100:1 to about 200:1.

The desired telomer is obtained by passing an olefin through the mixture of alkylaluminum chloride and titanium chloride defined above, preferably while the same is dissolved in an inert organic solvent, such as pentane, hexane, heptane, octane, xylene, toluene, benzene, cyclohexane, etc. Examples of olefins that can be employed to produce the desired telomer are ethylene, propylene, butene-1, pentene-1, hexene-1, heptene-1, octene-1 nonene-1 decene-1, etc. We prefer to employ ethylene. The temperature at which this is done can be, for example, from about 20° to about 150° C., preferably from about 80° to about 125° C., and the pressure from about 0 to about 700 pounds per square inch gauge, preferably from about 0 to about 500 pounds per square inch gauge. The reaction is then continued until the desired number of olefinic units are inserted between the alkyl substituent(s) and the aluminum on the alkylaluminum chloride. In general, while the reaction can be continued until any desired number of olefinic units are inserted between the alkyl substituent(s) and the aluminum on the alkylaluminum chloride, we prefer to terminate the reaction when about four to about five number of olefinic units are so inserted on each of the alkyl substituents. While the amount of time required to do this will vary depending on the other variables involved, in general when the amount of olefin passed through the catalyst system is from about ½ to about three mols per hour per total mol of said catalyst system, the amount of time can be from about four to about 15 hours.

The telomerization reaction is terminated as soon as the desired telomer is obtained merely by stopping the flow of olefin through the catalyst system of alkylaluminum chloride and the titanium chloride. The telomerization reaction that has been effected to obtain the desired telomer can be illustrated by the following equation, using ethylene as a representative olefin.

(1) $Rx-Al-Cl_y+N[CH_2=CH_2] \rightarrow$
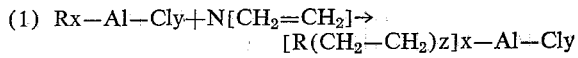
$[R(CH_2-CH_2)z]x-Al-Cl_y$ wherein R, $x$ and $y$ are as defined above, N represents the number of ethylene units available for addition to the alkylaluminum chloride and $z$ represents the mean number of ethylene molecules inserted into each of the hydrocarbon chains between R and the aluminum. The desired transalkylation involves reacting the telomer so obtained with an olefin to obtain an alkylaluminum chloride and the desired long chain alpha olefin in accordance with the following equation, again using ethylene as the representative olefin.

(2) $[R(CH_2-CH_2)_x]_x-Al-Cl_y+P[CH_2=CH_2] \rightarrow (CH_3-CH_2)_xAl-Cl_y+P[RCH=CH_2]$ wherein P can be equal to $x$ or less. The transalkylation reaction can be carried out, for example, at a temperature of about 150° to about 350° C., preferably about 200° to about 300° C., and a pressure of about 0 to about 3000 pounds per square inch gauge, preferably about 0 to about 2000 pounds per square inch gauge. Under these conditions effective transalkylation will be obtained when about five to about 20 mols of olefin per total mol of telomer product is employed in the transalkylation reaction. The reaction time can involve, for example, from about ½ to about four hours.

The conditions immediately above would be effective in the transalkylation reaction if titanium chloride were not in the system. As noted, the presence of a titanium chloride in the system during the telomerization reaction tends to promote additional undesirable telomerization. The removal of a titanium chloride from such a system is difficult, since alkylaluminums are sensitive to many agents that might be effective to remove the same, for example, water, air, alcohols, amines, etc.

We have found that the transalkylation reaction defined above can be rendered effective if the telomer product, prior to transalkylation, is treated with a selected aluminum. While we are not sure, we believe that the treatment of the telomer product with aluminum converts the now undesirable titanium chloride to an innocuous form of the same wherein it cannot coact with the alkylaluminum telomer present to obtain further telomerization. Instead, the desired transalkylation is effected.

We have additionally found the treatment of the telomer product with aluminum is substantially effective when a selected aluminum is employed. This aluminum is obtained by heating an aluminum halide, particularly aluminum chloride, while dissolved in an inert organic solvent, such as diphenyl ether, toluene, xylene, benzene, etc., and in an inert atmosphere, such as nitrogen, with about 20 to about 50 percent by weight thereof of an alkali metal, such as sodium or potassium having a particle size of about two to about 50 microns, preferably about five to about 20 microns, but particularly sodium at a temperature of about 25° to about 75° C., preferably about 25° to about 50° C., and a pressure of about 0 to about 700 pounds per square inch gauge, preferably about 0 to about 50 pounds per square inch gauge, for about five to 60 minutes, preferably for about five to about 30 minutes. At the end of the reaction the mixture can be filtered to recover the finely divided aluminum powder so obtained. The particle size of the aluminum will be from about two to about 50 microns, preferably from about five to about 20 microns.

Accordingly, the telomer product obtained in the first stage of the process is then heated with the aluminum powder at a temperature of about 50° to about 150° C., preferably about 80° to about 125° C. and a pressure of about 0 to about 700 pounds per square inch gauge, preferably about 0 to about 50 pounds per square inch gauge, for about five to about 60 minutes, preferably about 10 to about 30 minutes. The amount of aluminum powder required is at least equal in mols to the mols of the titanium compound present in the telomer product, but preferably will be from about two to about four mols per mol of the titanium compound present in the telomer product. The total reaction product thus obtained, or the filtrate resulting when such product is filtered, can then be treated with an olefin and the desired transalkylation reaction, as defined above, can then be permitted to proceed.

It is fortuitous herein that aluminum can be employed to render the telomer suitable for the transalkylation reaction, since aluminum being the same metal that forms a part of the telomer present will not adversely affect the same.

The procedure defined herein can further be illustrated by the following:

*Example I*

To a 500 cc. stirred reaction flask, which had been nitrogen flushed, there was added 91.5 grams of diphenyl ether and 8.45 grams of aluminum chloride. The mixture was then heated to 80° C. and the aluminum chloride dissolved therein. After cooling the solution to 26° C., 11.46 grams of a 35 percent sodium dispersion in mineral oil, wherein the sodium particles had an average particles size of about 7–15 microns, was incrementally added thereto while stirring over a period of 30 minutes. The temperature rose to 50° C. and then was permitted to cool to 25° C.

*Example II*

To a one-liter nitrogen flushed flask there was added 0.422 mol of ethylaluminum sesquichloride $$[(C_2H_5)_3-Al_2-Cl_3]$$

The ethylaluminum chloride was saturated by passing 5000 cc. of ethylene, therethrough per minute over a period of ½ hour. While continuing the flop of ethylene through the reaction system there was then added to the flask 0.35 cc. of titanium tetrachloride. The temperature throughout the reaction was maintained at 100–112° C. and the pressure at 0 pound per square inch gauge. One hour after the addition of the titanium tetrachloride to the system the ethylene consumption was 5.72 liters per hour. At this point the flow of ethylene was stopped and 38.9 grams of the solution obtained in Example I containing 0.02 mol of aluminum powder having an average particle size of 7–15 microns was added thereto. Ethylene was then added to the system at the same rate as previously and at the end of 15 minutes there was no ethylene consumption. The telomer product at this point was filtered under a nitrogen atmosphere and was again subjected to the telomerization conditions described above for one hour without any ethylene consumption. Then 0.70 cc. of titanium tetrachloride was added thereto and the telomerization conditions described above were continued. Immediately telomerization was resumed with an ethylene consumption for the next 15 minutes at the rate of 11.1 liters per hour. It is believed the reason for the greater rate of ethylene consumption in the latter case than at the beginning of the reaction can be explained by the fact that substantially more titanium tetrachloride was added to the system at the end of the reaction than at the beginning.

*Example III*

Into a 500 milliliter flask equipped with a thermometer and containing boiling chips there was added 269.0 grams of triisobutylaluminum. The flask was heated over a period of 13 hours and the temperature rose from 92° to 218° C. Isobutylene and hydrogen gas were evolved during the heating period and aluminum powder precipitated out of solution having an average particle size of 7–15 microns. During the heating period the reaction flask lost 75 grams of gas, which is the equivalent of isobutylene and hydrogen sufficient to produce 12 grams of aluminum powder.

*Example IV*

To a one liter nitrogen flushed flask there was added 0.88 mol of ethylaluminum sesquichloride

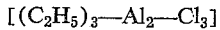

The ethylaluminum chloride was saturated by passing 5000 cc. of ethylene therethrough per minute over a period of ½ hour. While continuing the flow of ethylene through the reaction system there was then added to the flask 0.54 cc. of titanium tetrachloride. The temperature throughout the reaction was maintained at 80°–103° C. and the pressure at 0 pound per square inch gauge. Five hours after the addition of the titanium tetrachloride to the system the ethylene consumption was 4.5 liters per hour. At this point the ethylene flow was stopped and 6.0 grams of aluminum powder obtained in Example III and 97 grams of triisobutylaluminum hydride was added to the telomer product. The triisobutylaluminum hydride is an intermediate product formed in Example III during the decomposition reaction described therein and remains associated with the aluminum powder. Rather than produce any detrimental effect by its presence, it should, instead, aid the present endeavor, since it is a good reducing agent and would have a tendency to reduce the titanium chloride to elemental titanium which would not coact with the alkylaluminum compound present to promote undesired telomerization. Ethylene flow was resumed and at the end of 30 minutes it was found that ethylene consumption was at a rate of 4.4 liters per hour and the telomer continued to grow. No alpha olefins were recovered. This indicates that the treatment with the aluminum powder obtained in Example III was ineffective to change the nature of the titanium chloride present to one that would not assist the alkylaluminum compound to promote the telomerization reaction.

Obviously many modifications and variations of the invention, as hereinabove set forth, can be made without departing from the spirit and scope thereof, and therefore only such limitations should be imposed as are indicated by the appended claims.

We claim:

1. In a process wherein an alkylaluminum chloride is reacted with an olefin in the presence of a titanium chloride to obtain a telomer of said alkylaluminum chloride and said telomer is thereafter transalkylated with an olefin, the improvement which comprises treating said telomer prior to transalkylation with an aluminum powder obtained by contacting aluminum chloride with sodium.

2. The process of claim 1 wherein the aluminum chloride is contacted with sodium at a temperature in the range of about 25° to about 75° C.

3. The process of claim 2 wherein the olefin in each instance is ethylene.

4. The process of claim 3 wherein said telomer is treated with the aluminum powder at a temperature of about 50° to about 150° C.

5. The process of claim 4 wherein the treated telomer is transalkylated with ethylene at a temperature of about 150° to about 350° C.

References Cited
UNITED STATES PATENTS

| | | | |
|---|---|---|---|
| 2,871,276 | 1/1959 | Eiszner | 260—683.15 |
| 2,962,513 | 11/1960 | Meiners et al. | 260—448 |
| 3,013,043 | 12/1961 | Ziegler et al. | 260—448 |
| 3,100,231 | 8/1963 | Roha et al. | 260—448 |
| 3,179,677 | 4/1965 | Walde et al. | 260—683.15 |

PAUL M. COUGHLAN, Jr., *Primary Examiner.*